United States Patent [19]

Fukuda

[11] Patent Number: 4,918,144
[45] Date of Patent: Apr. 17, 1990

[54] VULCANIZABLE RUBBER COMPOSITION

[75] Inventor: Hideo Fukuda, Yokohama, Japan

[73] Assignee: Nippon Zeon Co., Ltd., Tokyo, Japan

[21] Appl. No.: 201,025

[22] Filed: Jun. 1, 1988

[51] Int. Cl.$^4$ ................................................. C08L 9/02
[52] U.S. Cl. ..................................... 525/263; 525/274
[58] Field of Search .............................. 525/263, 274

[56] References Cited

U.S. PATENT DOCUMENTS

| | | | |
|---|---|---|---|
| 3,700,637 | 10/1972 | Finch | 525/339 |
| 4,500,466 | 2/1985 | Hayes et al. | 525/274 |
| 4,656,219 | 4/1987 | Oyama et al. | 525/338 |
| 4,713,409 | 12/1987 | Hayes et al. | 525/263 |

OTHER PUBLICATIONS

Gummi, Fasern, Kunststoffe, vol. 37, No. 12, Dec. 1984, pp. 602–606, Gentner Verlag (Stuttgart), "Zetpol, ein Hochgesattigter Nitrilkautschuk".

*Primary Examiner*—Allan M. Lieberman
*Attorney, Agent, or Firm*—Sherman and Shalloway

[57] ABSTRACT

A vulcanizable composition comprising a highly saturated copolymer rubber derived at least from an ethylenically unsaturated nitrile and a conjugated diene and having a conjugated diene unit content in the polymer chain of not more than 30% by weight, an organic peroxide and zinc dimethacrylate.

12 Claims, No Drawings

VULCANIZABLE RUBBER COMPOSITION

This invention relates to a vulcanizable rubber composition, and more specifically, to a vulcanizable rubber composition capable of giving a vulcanizate having excellent strength properties when vulcanized with an organic peroxide.

Acrylonitrile/butadiene copolymer rubber (NBR) has found extensive use in appplications which require oil resistance. Usually, a sulfur vulcanizing system is used for this rubber. To obtain vulcanizates having excellent resistance to contamination by metal and heat aging resistance, an organic peroxide is used as a vulcanizer either alone or in combination of a compound having at least two ethylenically unsaturated bonds (i.e., a cross-linking coagent) such as triallyl isocyanurate or trimethylolpropane trimethacrylate.

The vulcanizates obtained with organic peroxides have inferior mechanical properties to vulcanizes obtained with the sulfur vulcanization system in spite of having the aforesaid excellent properties. It has been desired to improve their mechanical properties, especially tensile strength.

It is an object of this invention therefore to provide a vulcanizable rubber composition capable of giving a vulcanizate having improved tensile strength when vulcanized with an organic peroxide.

It has been known from British Patent No. 1,091,818 to add a metal salt of acrylic or methacrylic acid to an alpha-olefin polymer and vulcanize the polymer with an organic peroxide.

U.S. Pat. No. 4,191,671 discloses that a cured rubber having excellent abrasion resistance can be obtained by adding an alpha, beta-unsaturated carboxylic acid, a divalent metal compound and an organic peroxide, and curing the resulting rubber stock under heat.

Japanese Patent Publication No. 13475/1979 (Japanese Patent No. 980932) discloses that a cured rubber having improved tensile strength can be obtained by adding an alpha,beta-unsaturated carboxylic acid, a divalent metal compound, an organic peroxide, and a carboxylic acid or its metal salt not polymerizable with the organic peroxide, and curing the resulting rubber stock. The tensile strength of the cured product disclosed in this patent is 250 kg/cm$^2$ at the highest. This level of tensile strength does not exceed the level of tensile strength which is obtained by curing with an organic peroxide using carbon black as a reinforcing agent. This Japaense Patent quite fails to disclose the use of hydrogenated NBR (acrylonitrile-butadiene copolymer rubber) as the diene-type rubber.

U.S. Pat. No. 4,529,770 discloses that a cured product of a rubber composition comprising 100 parts by weight of a diene-type rubber, not more than 20 parts by weight of zinc dimethacrylate having a surface area of about 3.7 to 5.4 m$^2$/g or more, 30 to 70 parts by weight of a filler such as carbon black, silica or clay, and an organic peroxide has synergistically excellent tensile strength.

U.S. Pat. No. 4,500,466 discloses a rubber composition comprising 100 parts by weight of a diene-type rubber, 25 to 85 parts by weight of the zinc dimethacrylate mentioned above, and an organic peroxide. A cured product of this composition shows a tensile strength of about 320 kg/cm$^2$ only when natural rubber (which shows a high level of tensile strength even in the nonfilled state) is used as the diene-type rubber. When other rubbers are used, the cured products have a tensile strength of less than 300 kg/cm$^2$, which strength does not greatly exceed the level of tensile strength obtained when using a filler such as carbon black as a reinforcing material. The patent discloses NBR as the diene-type rubber, but is quite silent on hydrogenated NBR.

The present inventor has found surprisingly that by adding zinc dimethacrylate to hydrogenated NBR and curing the rubber stock with an organic peroxide, a very high level of tensile strength which cannot be attained by cured NBR can be obtained.

Thus, the present invention provides a vulcanizable composition comprising a highly saturated copolymer rubber derived at least from an ethylenically unsaturated nitrile and a conjugated diene and having a conjugated diene unit content in the polymer chain of not more than 30% by weight, an organic peroxide and zinc dimethacrylate.

The highly saturated copolymer rubber used in this invention includes a rubber resulting from hydrogenation of the conjugated diene units of a copolymer rubber derived from an ethylenically unsaturated nitrile monomer such as acrylonitrile or methacrylonitrile and a conjugated diene monomer such as 1,3-butadiene, isoprene, 1,3-pentadiene or 2,3-dimethyl-1,3-butadiene, a copolymer rubber derived from the aforesaid two types of monomer and another monomer copolymerizable with them [for example, an ethylenically unsaturated carboxylic acid ester such as methyl (meth)acrylate, ethyl (meth)-acrylate, propyl (meth)acrylate, butyl (meth)acrylate, methoxyethyl (meth)acrylate or ethoxyethyl (meth)-acrylate, or a cyano-substituted alkyl ester of (meth)-acrylic acid such as cyanomethyl (meth)acrylate, 1- or 2-cyanoethyl (meth)acrylate, 1-cyanopropyl (meth)-acrylate, 4-cyanobutyl (meth)acrylate, 6-cyanohexyl (meth)acrylate, 2-ethyl-6-cyanohexyl (meth)acrylate or 8-cyanooctyl (meth)acrylate], and a rubber resulting from hydrogenation of the conjugated diene units of this copolymer rubber. The highly saturated copolymer rubber has an ethylenically unsaturated nirile unit content of 10 to 60% by weight. If it is less than 10% by weight, the resulting rubber does not have sufficient oil resistance. If it exceeds 60% by weight, the resulting rubber has reduced elasticity. The conjugated diene unit content of the copolymer rubber is not more than 30% by weight. If it exceeds 30% by weight, no appreciable improvement in tensile strength can be achieved. Preferably, the conjugated diene unit content is 0 to 20% by weight.

The organic peroxide used in the invention may be any of those which are used in peroxide vulcanization of ordinary rubbers. Examples include dicumyl peroxide, di-t-butyl peroxide, t-butylcumyl peroxide, benzoyl peroxide, 2,5-dimethyl-2,5-di(t-butylperoxy)hexyne-3, 2,5-dimethyl-2,5-di(benzoylperoxy)hexane and 2,5-dimethyl-2,5-mono(t-butylperoxy)hexane. These organic peroxides, either alone or in combination of two or more, are used in an amount of usually 0.2 to 10 parts by weight, preferably 0.5 to 5 parts by weight, per 100 parts by weight of the rubber. The optimum amount may be properly determined depending upon the physical properties required.

Zinc dimethacrylate used in this invention may be, for example, one produced by the method of U.S. Pat. No. 4,500,466 or Japanese Laid-Open Patent Publication No. 138616/1976, or one produced in situ in the rubber. When a powder of zinc dimethacrylate is to be used, it is preferable to remove coarse particles by an air classifier, etc. To form zinc dimethacrylate in situ, methacrylic acid and an oxide, hydroxide or carbonate of zinc are added to the rubber and reacted. Preferably, the zinc compound is used after removing coarse particles by a classifier.

In the composition of this invention, the amount of the zinc dimethacrylate used is not particularly restricted. Preferably, it is 5 to 90 parts by weight per 100 parts by weight of the rubber. If it is less than 5 parts by weight or more than 90 parts by weight, it tends to exert a reduced effect of improving tensile strength. The especially preferred amount of zinc dimethacrylate is 10 to 70 parts by weight.

Various chemicals normally used in the rubber industry may be incorporated in the rubber composition of this invention besides the above components depending upon the purposes for which the resulting composition is used. Such chemicals include, for example, reinforcing agents such as carbon black and silica, fillers such as calcium carbonate and talc, crosslinking coagents such as triallyl isocyanurate and trimethylolpropane, plasticizers, stabilizers, processing aids and coloring agents.

The rubber composition may be produced by using an ordinary mixer such as a roll mill and a Banbury mixer.

Thus, the present invention gives a vulcanizable rubber composition having much higher tensile strength, lower dynamic heat generation and better heat aging resistance than the prior art.

The following examples illustrate the present invention more specifically. The parts and percentages in the following examples are by weight unless otherwise specified.

EXAMPLE 1

NBR having a combined acrylonitrile content of 37% by weight was hydrogenated in solution using Pd-carbon as a catalyst to give partially hydrogenated NBRs having a hydrogenation degree of 50% (with a butadiene unit content of 32%), 65% (22%), 80% (13%), 90% (6%), and 95% (3%) respectively.

In each run, a rubber composition was prepared in accordance with the compounding recipe shown in Table 1 using each of the partially hydrogenated NBRs. The composition was press-cured under the vulcanization conditions indicated in Table 1 to give a 2 mm-thick vulcanized sheet. The properties of the vulcanized sheet were measured in accordance with JIS K-6301, and the results are shown in Table 1.

TABLE 1

| Compounding recipe / Valcanizate properties | Comparison | | | | | | | | Invention | | | |
|---|---|---|---|---|---|---|---|---|---|---|---|---|
| Run No. | 1 | 2 | 3 | 4 | 5 | 6 | 7 | 8 | 9 | 10 | 11 | 12 |
| Hydrogenating degrees | | | | | | | | | | | | |
| 0% | 100 | | | | | | 100 | | | | | |
| 50% | | 100 | | | | | | 100 | | | | |
| 65% | | | 100 | | | | | | 100 | | | |
| 80% | | | | 100 | | | | | | 100 | | |
| 90% | | | | | 100 | | | | | | 100 | |
| 95% | | | | | | 100 | | | | | | 100 |
| ZnO | 5 | → | → | → | → | → | → | → | → | → | → | → |
| HAF carbon | 30 | → | → | → | → | → | — | — | — | — | — | — |
| Zn-MA (1) | 0 | → | → | → | → | → | 20 | → | → | → | → | → |
| PO (2) | 2.5 | 5 | → | → | → | → | → | → | → | → | → | → |
| Vulcanization conditions | | | | | | | | | | | | |
| Temperature (°C.) | 180 | → | → | → | → | → | → | → | → | → | → | → |
| Time (minutes) | 15 | 30 | → | → | → | → | → | → | → | → | → | → |
| Vulcanizate properties | | | | | | | | | | | | |
| Tensile strength (kg/cm$^2$) | 154 | 158 | 161 | 187 | 212 | 226 | 216 | 246 | 360 | 450 | 454 | 484 |
| Elongation (%) | 180 | 180 | 230 | 260 | 270 | 290 | 240 | 270 | 410 | 460 | 480 | 560 |
| Hardness (JIS) | 72 | 72 | 74 | 74 | 73 | 74 | 75 | 72 | 68 | 66 | 66 | 66 |

Note:
(1) Zinc dimethacrylate
(2) α,α'-bis(t-butylperoxy-m,p-isopropylbenzene), purity 40%

EXAMPLE 2

In each run, a rubber composition was prepared in accordance with the compounding recipe shown in Table 2 using the partially hydrogenated NBR having a hydrogenation degree of 90% produced in EXAMPLE 1. The composition was press-cured under the vulcanization conditions indicated in Table 2, and the properties of the vulcanizate were measured. The results are shown in Table 2.

TABLE 2

| Compounding recipe / Vulcanizate properties | Run No. Invention | | | | | |
|---|---|---|---|---|---|---|
| | 13 | 14 | 15 | 16 | 17 | 18 |
| NBR (hydrogenation degree 90%) | 100 | → | → | → | → | → |
| Zn-MA (1) | 0 | 5 | 10 | 20 | 40 | 80 |
| ZnO | 5 | → | → | → | → | → |
| PO (2) | 5 | → | → | → | → | → |
| Vulcanization conditions | | | | | | |
| Temperature (°C.) | 180 | → | → | → | → | → |
| Time (minutes) | 30 | → | → | → | → | → |
| Vulcanizate properties | | | | | | |
| Tensile strength (kg/cm$^2$) | 70 | 201 | 360 | 450 | 470 | 380 |
| Elongation (%) | 410 | 450 | 480 | 460 | 450 | 360 |
| Hardness (JIS) | 50 | 55 | 58 | 65 | 81 | 96 |

Notes (1) and (2): Same as the footnote to Table 1.

EXAMPLE 3

As in Example 1, partially hydrogenated NBRs having a combined acrylonitrile content of 45% by weight and a hydrogenation degree of 50% (with a butadiene unit content of 22%), 85% (8%) and 95% (3%) respectively were produced. In each run, a rubber composition was prepared in accordance with the compounding recipe shown in Table 3. The composition was press-cured under the vulcanization conditions indicated in Table 3, and the properties of the vulcanizate were measured. The results are shown in Table 3.

TABLE 3

| Compounding recipe Vulcanizate properties | | Run No. Invention | | |
|---|---|---|---|---|
| | | 19 | 20 | 21 |
| Hydrogenation degree of NBR | 50% | 100 | | |
| | 85% | | 100 | |
| | 95% | | | 100 |
| ZnO | | 5 | → | → |
| Zn-MA (1) | | 30 | → | → |
| PO (2) | | 5 | → | → |
| Vulcanization conditions | | | | |
| Temperature (°C.) | | 180 | → | → |
| Time (minutes) | | 30 | → | → |
| Vulcanizate properties | | | | |
| Tensile strength (kg/cm²) | | 380 | 512 | 536 |
| Elongation (%) | | 370 | 490 | 510 |
| Hardness (JIS) | | 77 | 73 | 73 |

Notes (1) and (2): Same as the footnote to Table 1.

EXAMPLE 4

In each run, a rubber composition was prepared in accordance with the compounding recipe shown in Table 4 using the partially hydrogenated NBR having a hydrogenation degree of 90% obtained in Example 1. The composition was press-cured under the vulcanization conditions shown in Table 4, and the properties of the vulcanizate were measured. The results are shown in Table 4.

TABLE 4

| Compounding recipe Vulcanizate properties | Run No. | |
|---|---|---|
| | Comparison 22 | Invention 23 |
| Zetpol 2030 (3) | 100 | 100 |
| SRF carbon black | 60 | — |
| Zn-MA (1) | — | 30 |
| ZnO | 5 | 5 |
| PO (2) | 6 | 6 |
| Vulcanizate properties (vulcanized at 180° C. for 20 minutes) | | |
| Tensile strength (kg/cm²) | 243 | 470 |
| Elongation (%) | 150 | 500 |
| Hardness (JIS) | 74 | 74 |
| Goodrich Flexometer (test temperature 150° C.) | | |
| Heat build up (°C.) | 25 | 19 |
| Aging test in air oven (150° C. × 3 days) | | |
| % change in tensile strength | −3 | −6 |
| % change in elongation | −32 | −16 |
| Change in hardness (JIS) | +7 | +3 |

Note (3): Hydrogenated NBR produced by Nippon Zeon Co., Ltd.
Notes (1) and (2) are the same as the footnote to Table 1.

EXAMPLE 5

In each run, a rubber composition was prepared in accordance with the compounding recipe shwon in Table 5 using the partially hydrogenated NBR having a hydrogenation degree of 90% obtained in EXAMPLE 1. The composition was pres-cured under the vulcanization conditions shown in Table 5, and the properties of the vulcanizate were measured. The results are shown in Table 5

TABLE 5

| Compounding recipe Vulcanizate properties | Run No. | | | | | | |
|---|---|---|---|---|---|---|---|
| | Invention | | | | Comparison | | |
| | 24 | 25 | 26 | 27 | 28 | 29 | 30 |
| NBR (hydrogenation degree of 90%) | 100 | → | → | → | — | — | — |
| NBR (4) | — | — | — | — | 100 | → | → |
| Zn-MA (1) | 30 | → | → | → | → | → | → |
| ZnO | 5 | → | → | → | → | → | → |
| PO (2) | 5 | → | → | → | → | → | → |
| Clay (5) | — | 50 | — | — | 50 | — | — |
| Silica (6) | — | — | 50 | — | — | 50 | — |
| HAF carbon black | — | — | — | 50 | — | — | 50 |
| Vulcanization conditions | | | | | | | |
| Temperature (°C.) | 180 | → | → | → | → | → | → |
| Time (minutes) | 20 | → | → | → | → | → | → |
| Vulcanizate properties | | | | | | | |
| Tensile strength (kg/cm²) | 532 | 318 | 311 | 376 | 136 | 161 | 140 |
| Elongation (%) | 440 | 340 | 250 | 210 | 120 | 100 | 80 |
| Hardness (JIS) | 74 | 83 | 92 | 90 | 86 | 94 | 95 |

Notes
(1) and (2) are the same as the footnote to Table 1.
(4): Bound acrylonitrile 37% by weight
(5): Dixie clay produced by Vanderbilt Company, Inc.
(6): Carplex #1120 produced by Shionogi Pharmaceutical Co., Ltd.

EXAMPLE 6

In each run, a rubber composition was prepared in accordance with the compounding recipe shown in Table 6 using the partially hydrogenated NBR having a hydrogenation degree of 90% obtained in Example 1. The composition was press-cured under the vulcanization conditions shown in Table 6, and the properties of the vulcanizates were measured. The results are shown in Table 6.

TABLE 6

| Compounding recipe Vulcanizate properties | Run No. Invention | | | |
|---|---|---|---|---|
| | 31 | 32 | 33 | 34 |
| NBR (hydrogenation degree of 90%) | 100 | → | → | → |
| Activated ZnO | 20 | 16 | — | — |
| ZnO | — | — | 20 | 16 |
| Methacrylic acid | 30 | 24 | 30 | 24 |
| PO (2) | 5 | → | → | → |
| Vulcanization conditions | | | | |
| Temperature (°C.) | 180 | → | → | → |
| Time (minutes) | 30 | → | → | → |
| Vulcanizate properties | | | | |
| Tensile strength (kg/cm²) | 498 | 518 | 526 | 573 |
| Elongation (%) | 350 | 460 | 290 | 430 |
| Hardness (JIS) | 81 | 72 | 82 | 74 |

Note (2) is the same as the footnote to Table 1.

What is claimed is:
1. A vulcanizable composition comprising: a copolymer rubber derived at least from an ethylenically unsaturated nitrile and a conjugated diene and having a conjugated diene unit content in the polymer chain of not more than 30% by weight, 0.2 to 10 parts by weight per 100 parts by weight of said copolymer rubber of an organic peroxide and 5 to 90 parts by weight per 100 parts by weight of said copolymer rubber of zinc dimethacrylate.
2. The composition of claim 1 wherein the amount of zinc dimethacrylate is 10 to 70 parts by weight per 100 parts by weight of the rubber.

3. The composition of claim 1 or 2 wherein the amount of the organic peroxide is 0.5 to 5 parts by weight per 100 parts by weight of the rubber.

4. The composition of claim 1 or 2 wherein the copolymer rubber is a copolymer rubber resulting from hydrogenation of the conjugated diene units of a copolymer rubber derived from an ethylenically unsaturated nitrile and a conjugated diene.

5. The composition of claim 1 or 2 wherein the copolymer rubber is a copolymer rubber derived from an ethylenically unsaturated nitrile, a conjugated diene and another copolymerizable monomer.

6. The composition of claim 1 or 2 wherein the copolymer rubber is a copolymer rubber resulting from hydrogenation of the conjugated diene units of a copolymer rubber derived from an ethylenically unsaturated nitrile, a conjugated diene and another copolymerizable monomer.

7. The composition of claim 3 wherein the copolymer rubber is a copolymer rubber resulting from hydrogenation of the conjugated diene units of a copolymer rubber derived from an ethylenically unsaturated nitrile and a conjugated diene.

8. The composition of claim 3 wherein the copolymer rubber is a copolymer rubber derived from an ethylenically unsaturated nitrile, a conjugated diene and another copolymerizable monomer.

9. The composition of claim 3 wherein the copolymer rubber is a copolymer rubber resulting from hydrogenation of the conjugated diene units of a copolymer rubber derived from an ethylenically unsaturated nitrile, a conjugated diene and another copolymerizable monomer.

10. The composition of claim 1 wherein said zinc dimethacrylate is produced in situ in the rubber by the reaction of a zinc compound and methacrylic acid added separately to said copolymer rubber.

11. The composition of claim 1 wherein said copolymer rubber has a nitrile unit content of 10 to 60% by weight.

12. The composition of claim 1 wherein said copolymer rubber has a conjugated diene unit content of 0 to 20% by weight.

* * * * *